United States Patent
Gayal et al.

(10) Patent No.: US 9,516,098 B2
(45) Date of Patent: Dec. 6, 2016

(54) SYSTEM FOR GENERATING A RESPONSE TO A CLIENT REQUEST

(71) Applicant: BANK OF AMERICA CORPORATION, Charlotte, NC (US)

(72) Inventors: Nirmala Gayal, Gurgaon (IN); Rahul Mahajan, Gurgaon (IN); Yolanda D. James, Tampa, FL (US); Venkatesh Naidu, Hyderabad (IN); Raghavendran Narasimhan, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 279 days.

(21) Appl. No.: 14/261,105

(22) Filed: Apr. 24, 2014

(65) Prior Publication Data

US 2015/0312321 A1  Oct. 29, 2015

(51) Int. Cl.

| | |
|---|---|
| *G06F 15/16* | (2006.01) |
| *H04L 29/08* | (2006.01) |
| *G06F 3/0484* | (2013.01) |
| *G06F 17/24* | (2006.01) |
| *G06Q 10/10* | (2012.01) |
| *G06Q 10/06* | (2012.01) |
| *H04L 29/06* | (2006.01) |

(52) U.S. Cl.
CPC ........... *H04L 67/10* (2013.01); *G06F 3/04842* (2013.01); *G06F 17/248* (2013.01); *G06Q 10/06* (2013.01); *G06Q 10/10* (2013.01); *H04L 67/42* (2013.01)

(58) Field of Classification Search
CPC .......... H04L 67/10; H04L 67/42; H04L 29/08; G06F 3/04842; G06Q 10/10
USPC .......................................................... 709/203
See application file for complete search history.

(56) References Cited

U.S. PATENT DOCUMENTS

| 8,639,625 | B1 * | 1/2014 | Ginter | G06F 21/10 |
| | | | | 705/50 |
| 9,067,150 | B2 * | 6/2015 | Konkle | A63F 13/87 |
| 2003/0004818 | A1 * | 1/2003 | Hoffman | G06Q 30/02 |
| | | | | 705/26.43 |
| 2008/0120129 | A1 * | 5/2008 | Seubert | G06Q 10/06 |
| | | | | 705/35 |
| 2012/0109711 | A1 * | 5/2012 | Boe | G06Q 30/02 |
| | | | | 705/7.31 |

* cited by examiner

*Primary Examiner* — Khanh Dinh
*Assistant Examiner* — S M Rahman
(74) *Attorney, Agent, or Firm* — Michael A. Springs; Moore & Van Allen PLLC; W. Kevin Ransom (57) ABSTRACT

Embodiments of the invention are directed to a system, method, and computer program product for generating a response to a client request. The system typically including a memory, a processor and a module configured to receive a request associated with a service from a client; initiate the presentation of a first user interface, wherein the first user interface enables a user selection of one or more template types; initiate the presentation of a second user interface based on at least a user selection of one or more template types, wherein the second user interface enables a user selection of one or more templates associated with the selected template type; receive a client progress from the user based on at least the selection of the one or more templates to generate a response, wherein the response reflects the status of the request; and transmit the response to the client.

20 Claims, 5 Drawing Sheets

SYSTEM FOR GENERATING A RESPONSE TO A CLIENT REQUEST

BACKGROUND

There is a need for a system to respond to a request associated with a client request.

BRIEF SUMMARY

Embodiments of the present invention address the above needs and/or achieve other advantages by providing apparatuses (e.g., a system, computer program product, and/or other device) and methods for a system to generate a response to a status request associated with a service request.

Embodiments of the invention comprise systems, computer program products, and methods to respond to a client request.

According to embodiments of the invention, a system for authenticating a user using self-selected preferences is presented, the system comprising: a processor; a memory; a module stored in memory executable by a processor, and configured to cause the processor to receive a request associated with a service from a client; initiate the presentation of a first user interface, wherein the first user interface enables a user selection of one or more template types, wherein the selection of one or more template types are based on at least the service; initiate the presentation of a second user interface based on at least a user selection of one or more template types, wherein the second user interface enables a user selection of one or more templates associated with the selected template type, wherein the selected one or more templates is based on at least the request associated the with the service; receive a client progress from the user based on at least the selection of the one or more templates to generate a response, wherein the response reflects the status of the request, wherein the receiving a client progress further comprises: determining a status associated with one or more stages of the service; and determining one or more products and documents associated with the service, wherein the one or more products and documents are a requirement for a completed implementation of the service; and transmit the response to the client.

In some embodiments, the request comprises a status request.

In some embodiments, the second user interface enables a user selection of a template from a dropdown list of one or more templates to generate an overview of the selected template.

In some embodiments, the one or more stages comprises one or more selectable options indicating a progress level associated with the one or more stages.

In some embodiments, the one or more stages are at least one of getting started, documentation, implementation, training, and confirmation.

In some embodiments, the response comprises a completion status associated with each of the one or more stages associated with the service.

In some embodiments, the response comprises an estimated time of completion of the service.

In some embodiments, the response comprises standard verbiage.

In some embodiments, the one or more products and documents are presented in a tabular format.

In some embodiments, the table associated with the one or more products comprises at least one of a product name, a product parent, a brief description of the product, and account information associated with the client.

In some embodiments, the table associated with the documents comprises at least one of a document type and a document title.

In some embodiments, the response comprises a client information, wherein the client information comprises at least one of a client contact information, client notes, and client dates associated with the service.

In some embodiments, the response comprises a template option, wherein the template option enables a user to navigate between one or more templates.

In some embodiments, a user selection of the template option initiates the presentation of the second user interface to enable a user selection of one or more templates.

In some embodiments, the second user interface comprises an index option, wherein the index option initiates the presentation of the first user interface to enable a user selection of one or more template types.

In some embodiments, the response comprises an option to send the response as an email to the client, wherein a user selection of the option to send the response as an email to the client comprises an initiation of an email client associated with the module.

In some embodiments, the module is further configured to automatically capture a client name and a company name in the email to the client.

In some embodiments, the response comprises one or more hyperlinks.

In some embodiments, the one or more template types are associated with at least one of a one or more treasury products and one or more cash management essentials.

In one aspect, the present invention is directed to a method for use in a network environment associated with a service provider, whereby a response associated with a service request is generated, the method comprising: receiving, using a computing device processor, a request associated with a service from a client; initiating, using a computing device processor, the presentation of a first user interface, wherein the first user interface enables a user selection of one or more template types, wherein the selection of one or more template types are based on at least the service; initiating, using a computing device processor, the presentation of a second user interface based on at least a user selection of one or more template types, wherein the second user interface enables a user selection of one or more templates associated with the selected template type, wherein the selected one or more templates are based on at least the request associated the with the service; receiving, using a computing device processor, a client progress from the user based on at least the selection of the one or more templates to generate a response, wherein the response reflects the status of the request, wherein the receiving a client progress further comprises: determining a status associated with one or more stages of the service; and determining one or more products and documents associated with the service, wherein the one or more products and documents are a requirement for a completed implementation of the service; and transmitting, using a computing device processor, the response to the client.

In one aspect, the present invention is directed to a computer program product for use in a network environment associated with a service provider, whereby a response associated with a service request is generated, the computer program product comprising a non-transitory computer-readable medium comprising code causing a first apparatus to: receive a request associated with a service from a client;

initiate the presentation of a first user interface, wherein the first user interface enables a user selection of one or more template types, wherein the selection of one or more template types are based on at least the service; initiate the presentation of a second user interface based on at least a user selection of one or more template types, wherein the second user interface enables a user selection of one or more templates associated with the selected template type, wherein the selected one or more templates are based on at least the request associated the with the service; receive a client progress from the user based on at least the selection of the one or more templates to generate a response, wherein the response reflects the status of the request, wherein the receiving a client progress further comprises: determining a status associated with one or more stages of the service; and determining one or more products and documents associated with the service, wherein the one or more products and documents are a requirement for a completed implementation of the service; and transmit the response to the client.

BRIEF DESCRIPTION OF THE FIGURES

Having thus described embodiments of the invention in general terms, reference will now be made to the accompanying drawings, where:

FIG. 4 illustrates an exemplary embodiment of the response to the client request according to one aspect of the present invention

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

In some embodiments, the "user" may be a user (e.g., an account holder or a person who has an account (e.g., banking account, credit account, or the like)), or an employee (e.g., an underwriter, a project manager, an IT specialist, a manager, an administrator, an internal operations analyst, or the like). In another embodiment, the user may refer to an individual within a group. In one aspect, a user may be any individual who uses the system described herein to generate a response to a client request. In some other embodiments, the "client" may be an individual, a group of individuals, or an entity associated with the financial institution. For example, a client may have a financial institution account associated with the financial institution. In another example, a client may have applied for a loan/mortgage with the financial institution.

In one aspect, the entity may provide one or more services to a client based on a specific request. In some embodiments, one or more services may be associated with opening a new account (e.g., checking account, savings account, investment account, or the like), a bank loan (e.g., personal loans, commercial loans, mortgage loans, or the like), credit cards, wire transfers, or the like. In some embodiments, the one or more services may be treasury products such as promissory notes, interest swaps, currency swaps, and interest options. In one aspect, treasury products may include money market products such as term deposits, T-bills, government bonds, commercial papers, and corporate bonds. In some embodiments, the one or more services may be cash management essentials such as account reconcilement, commercial deposits, electronic stop payments, information reporting, or the like.

Typically, responding to a client request includes gathering data associated with the client request from multiple sources and drafting a response accordingly. In some embodiments, the client request may be processed by multiple departments within the entity, In such cases, generating a response may include determining a status of the client request from each of the departments working on the client request individually to determine an overall client progress. In some embodiments, completing a client request may require one or more documents from the client. In such cases, determining a client progress may include determining one or more documents already received from the client, one or more documents received from the client and considered, one or more documents received from the client and not considered, one or more documents yet to be received from the client, or the like. A client request processed by multiple departments may require retrieving documents from one or more databases associated with individual departments every time a response needs to be generated. The claimed invention attempts to rectify the inefficiencies associated with generating a response to a client request.

Figure 1:
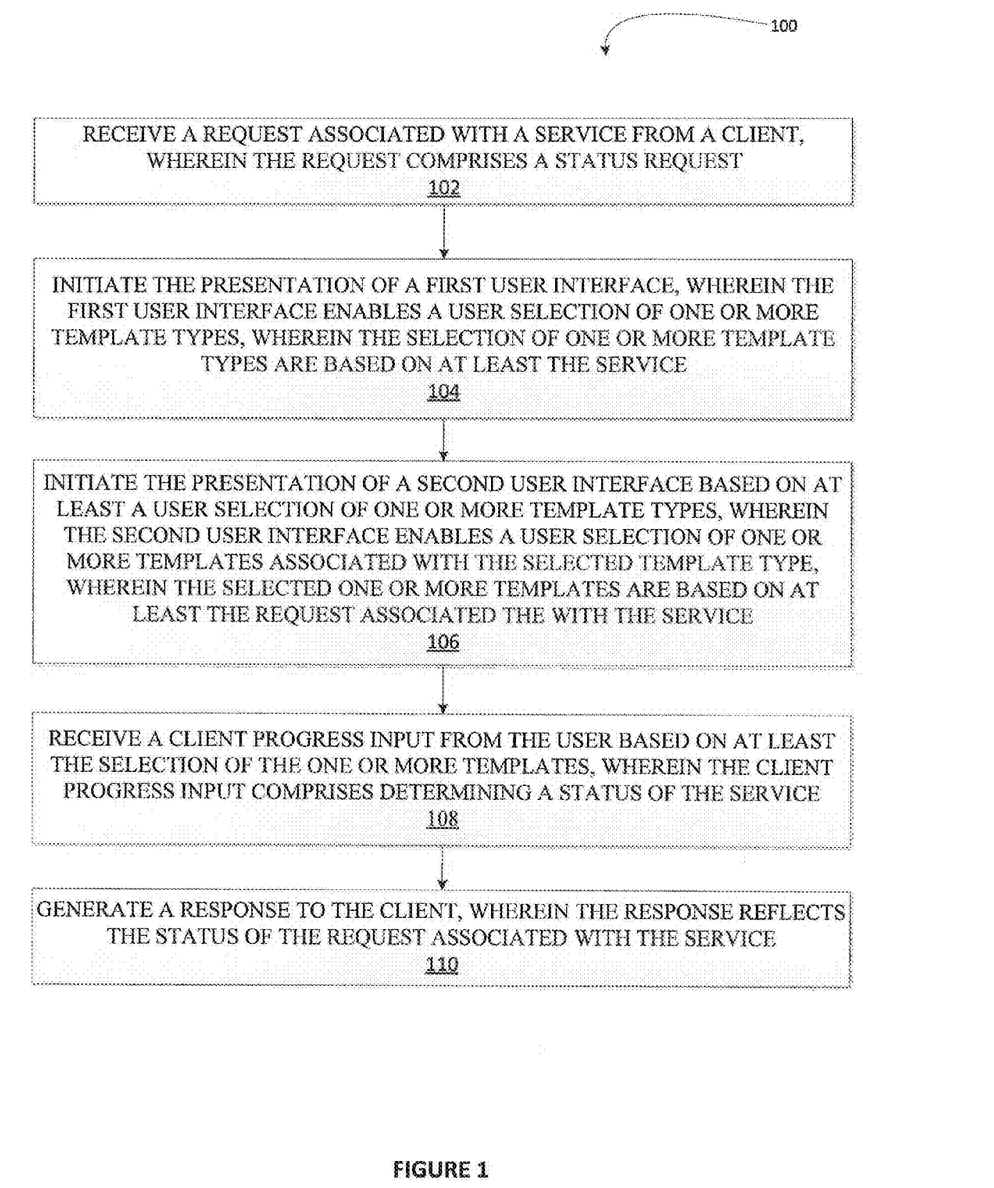
FIG. 1 presents high level process flow for generating a response to a client request according to an embodiment of the invention.

FIG. 1 presents a high level process flow for generating a response to a client request 100. As shown in block 102, the process flow includes receiving a request associated with a service from a client, wherein the request comprises a status request. In some embodiments, the service may be associated with a treasury product. In some other embodiments, the service may be associated with cash management essentials. For example, if the service required by a client is a commercial loan, the request associated with the commercial loan may be a status request to determine whether all the entity has received all the documents required to complete the request. In some embodiments, the status request may include an estimated completion date.

In response to receiving a request, the process flow includes initiating the presentation of a first user interface, wherein the first user interface enables a user selection of one or more template types, wherein the selection of one or more template types are based on at least the service, as shown in block 104. In one aspect, a template type may be associated with treasury products. In another aspect, a template type may be associated with cash management essentials. In some embodiments, each template type is associated with one or more templates.

In response to initiating the presentation of the first user interface, the process flow includes initiating the presentation of a second user interface based on at least a user selection of one or more template types, as shown in block 106. In one aspect, the second user interface enables a user selection of one or more templates associated with the selected template type, wherein the user selection of one or more templates is based on at least the service associated with the client request. In one aspect, each template may be associated with a specific service provided to a client by the entity. In some embodiments, each template may include a client progress checklist, standard verbiage, completion status under each stage of the request, products associated with the service, documentation associated with the service, and/or a website link associated with the service which may help indicate a status of the service.

In response to a user selection of one or more templates, the process flow may receive a client progress input from the user, as shown in block 108. In one aspect, the client progress may include one or more stages. For example, one or more stages associated with the service may include (1) getting started, (2) documentation, (3) implementation, (4) training, and (5) confirmation. In some embodiments, the completion of a service may include completion of one or more stages associated with the service. The completion of each stage may be indicated by one or more options associated with the stage. For example, an indication of completion of the documentation stage may include a user selection of one or more options (e.g., received with request, pending, and received) reflecting a client progress. In some embodiments, the client progress may include determining a status associated with each stage of the service, wherein the status comprises an estimated completion date. In another embodiment, the client progress may include determining one or more products required for implementation of the service. In yet another embodiment, the client progress may include determining one or more documents required for implementation of the service.

In response to receiving a client progress input, the process flow includes generation of a response to a client reflecting the status of the request associated with the service, as shown in block 110.

Figure 2:
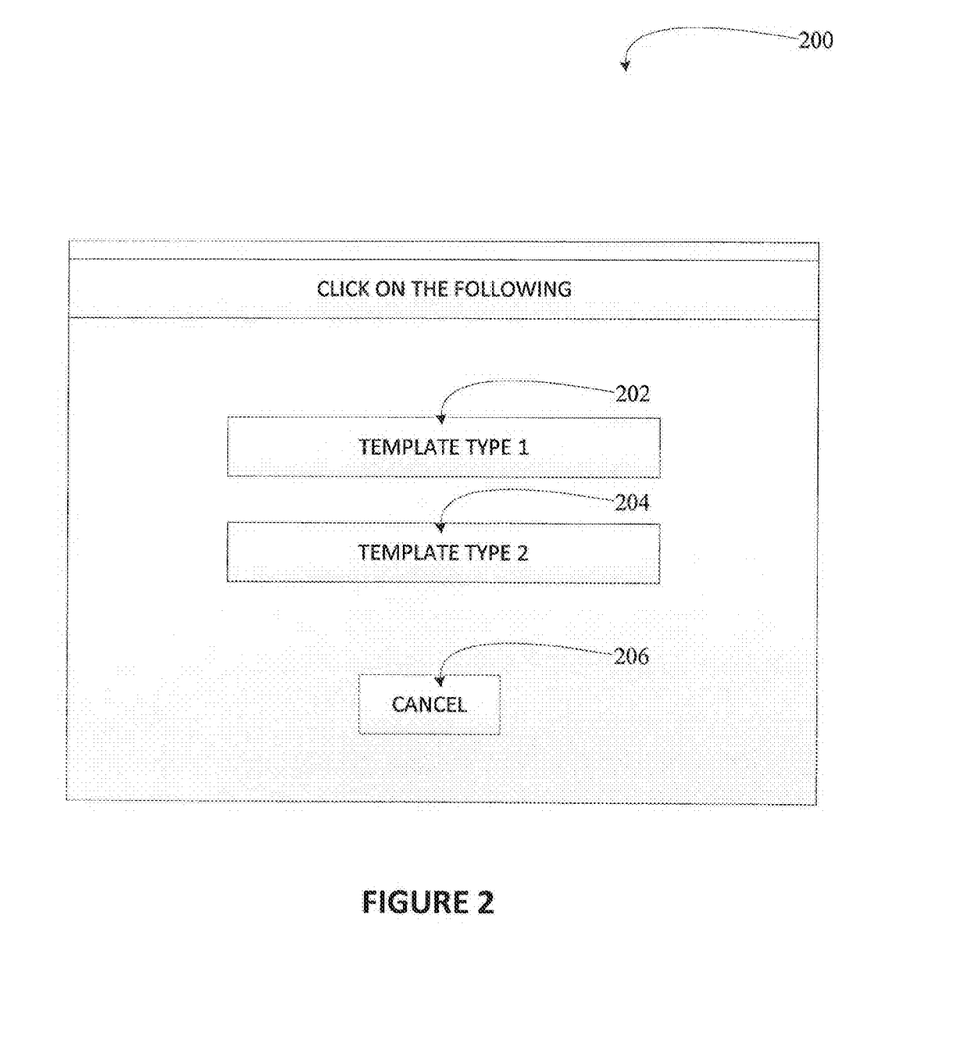
FIG. 2 illustrates a first user interface for generating a response to a client request according to an embodiment of the invention.

FIG. 2 illustrates a first user interface according to an embodiment of the invention 200. In some embodiments, the first user interface 200 enables a user selection of one or more template types, as referenced by template type 1 202 and template type 2 204. In some embodiments, the first user interface comprises a cancel option 206. In one aspect, the system may initiate the presentation of the first user interface 200 based on at least receiving a client request.

Figure 3:
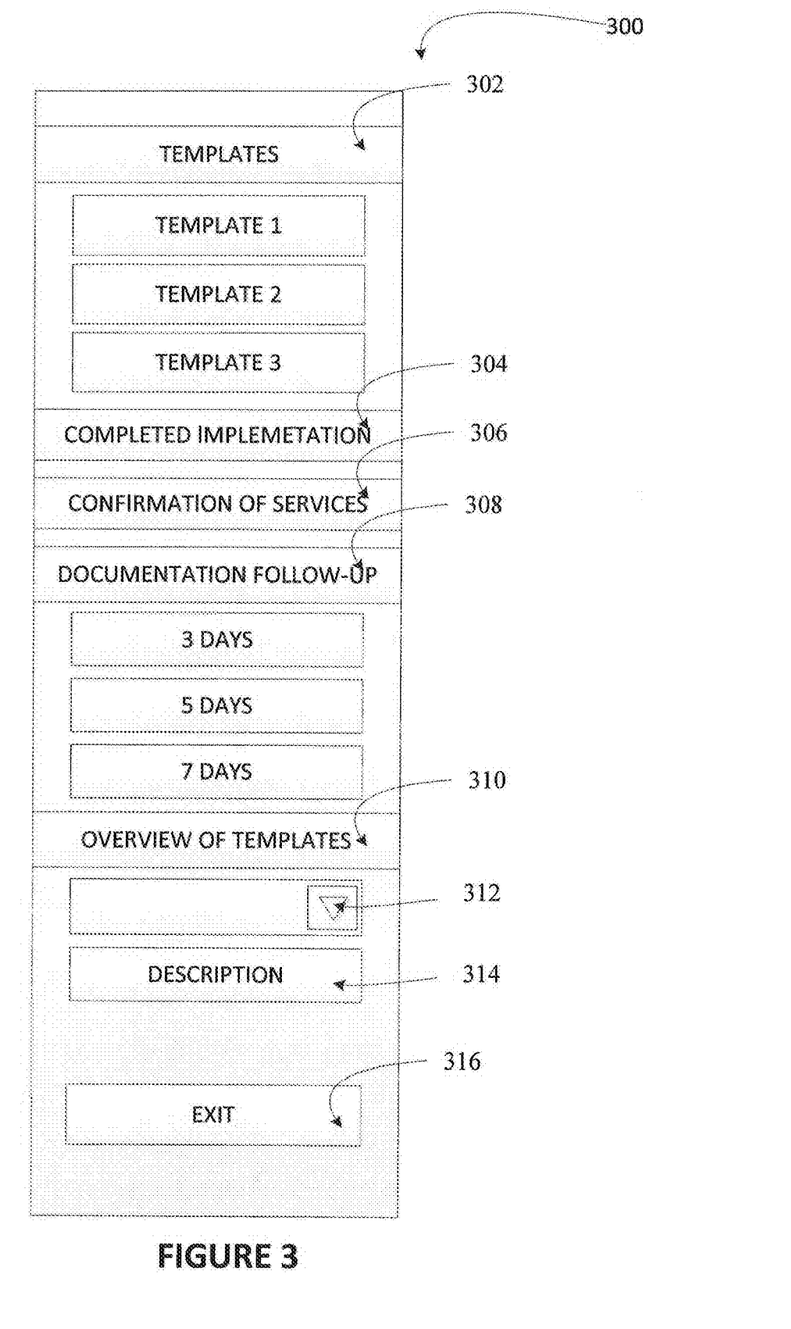
FIG. 3 illustrates a second user interface for generating a response to a client request according to an embodiment of the invention.

FIG. 3 illustrates a second user interface according to an embodiment of the invention 300. In some embodiments, the second user interface 300 enables a user selection of one or more templates associated with the template type selected by the user from the first user interface 200. In one aspect, the user selection of one or more templates is based on at least the service associated with the request. In some other embodiments, the second user interface includes a completed implementation option 304 identifying one or more products and/or documents associated with an effective implementation of the service by the client. In yet another embodiment, the second user interface 300 includes a confirmation of services option 306 identifying one or more services completed by the entity. In one aspect, the confirmation of services may include information associated with a scheduled meeting with the client, receipt of documentation, and/or acknowledgement of one or more services associated with the client. In some embodiments, the second user interface 300 includes a documentation follow-up option 308.

In further embodiments, the second user interface includes an overview of templates option 310 which provides the user with an overview of each of the one or more templates associated with the selected template type. In one aspect, the second user interface 300 may enable a user selection of a template from a dropdown list of templates 312 to generate an overview of the selected template. In one aspect, the user may select the description option 314 to generate the overview. In some embodiments, the user may choose to exit the second user interface 300 using the exit option 316.

FIG. 4 illustrates an exemplary embodiment of the response to the client request according to one aspect of the present invention 400. In some embodiments, the response comprises one or more stages 402, products required for a completed implementation 418, documentation associated with the completed implementation 428, client information 434, an email body comprising standard verbiage 438, templates 416, and send email 414. In one aspect, the one or more stages 402 include getting started 404, documentation 406, implementation 408, training 410, and confirmation 412. In some embodiments, each stage may include one or more options describing a progress associated with each stage. For example, as illustrated in FIG. 4, the getting started stage 404 includes a "yes" option and a "connect call" option; the documentation stage 406 includes a "received with request" option, a "pending" option, and a "received" option; the implementation stage 408 includes an "in progress" option, a "follow up" option, and a "completed option"; the training stage 410 includes a "scheduled" option, an "in progress" option, "a complete" option, and an "opt-out" option; and the confirmation stage 412 includes a "logged in" option, an "entitled" option, and a use" option. In some embodiments, the confirmation stage 412 includes an estimated completion date. In one aspect, the user may choose to present an estimated completion date along with a progress check list to the client based on the progress levels associated with the one or more stages.

In some embodiments, the response may include a product table 418 based on at least a user selection of a check box indicating a product table requirement 434 and a documentation table 428 based on at least a user selection of a check box indicating a documentation requirement 436. In one aspect, the product table 418 may include a product 420, a product parent 422, a brief discussion associated with the product 424, and account information associated with the client 426. In another aspect, the documentation table 428 may include a document type 430 and a document title 432. In addition, the response may include client contact information comprising client notes and dates associated with the correspondence.

In some other embodiments, the response may include a template option 416 for the user to seamlessly switch templates. The user may, at any time during the generation of the response, may select the templates option 416. In response to selecting the template option 416, the system may initiate the presentation of the second user interface 300 to enable a user selection of one or more other templates. In some embodiments, the second user interface 300 may include an index option (not shown) to direct a user to the first user interface 200 to select a different template type.

In further embodiments, the response 400 may enable a user selection of the send email option 414. In response to a user selection of the send email option, the system may initiate the presentation of an email client associated with the system. The email client may automatically include the response in the body of the email making the client name/company name sections editable for the user to complete. In addition, the email client may automatically include a subject line based on the selected template for the response. In this way, the user may have to simply enter the email address of the client and thereby send a response to the client.

Figure 5:
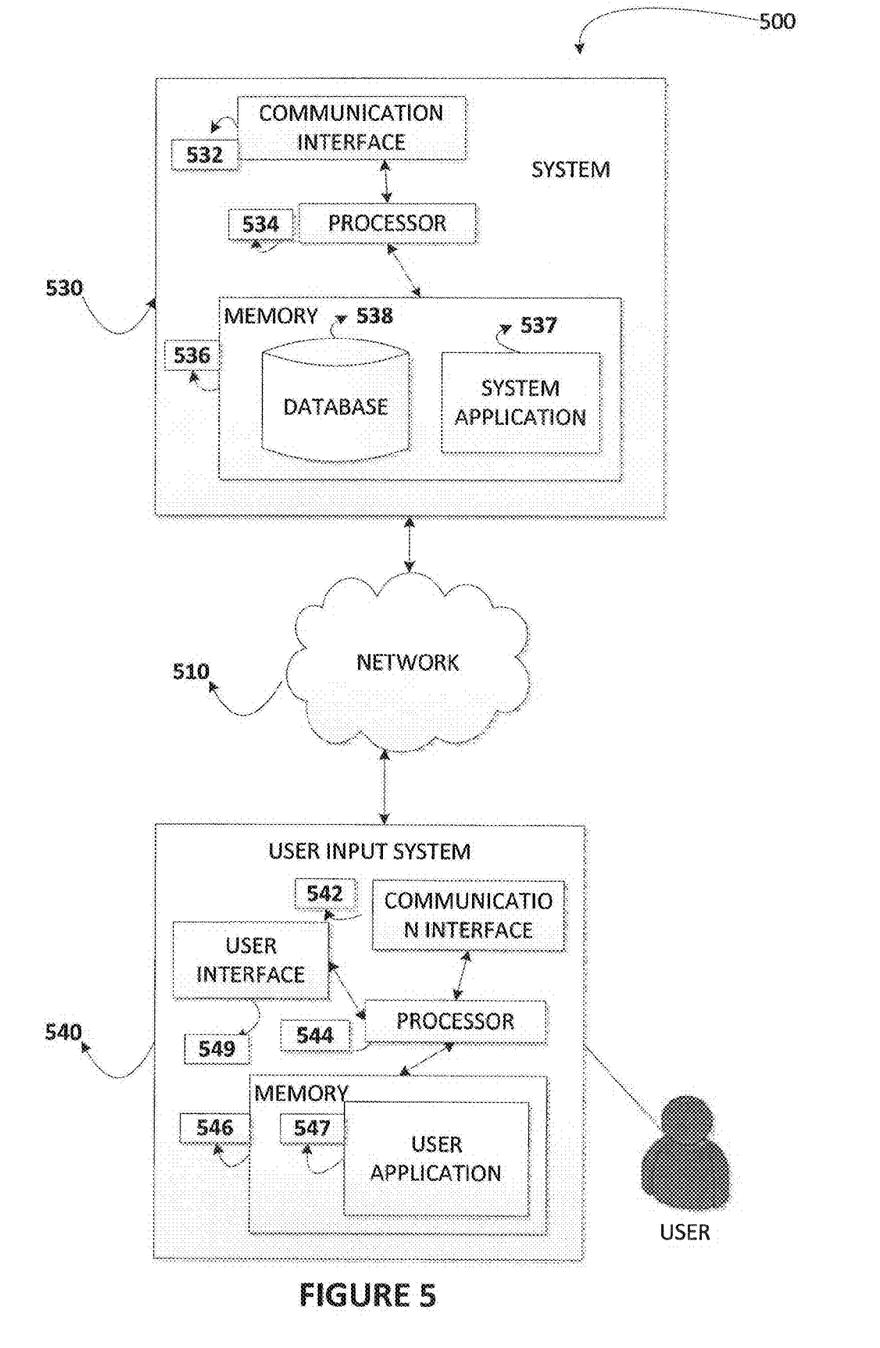
FIG. 5 illustrates an exemplary block diagram of the system environment.

FIG. 5 presents an exemplary block diagram of the system environment 500 for implementing the process flows described herein in accordance with embodiments of the present invention. As illustrated, the system environment 500 includes a network 510, a system 530, and a user input system 540. Also shown in FIG. 5 is a user of the user input system 540. The user input system 540 may be a mobile device or other non-mobile computing device. The user may be a person who uses the user input system 540 to execute a user application 547. The user application 547 may be an application to communicate with the system 530, perform a transaction, input information onto a user interface presented on the user input system 540, or the like. The user application 547 and/or the system application 537 may incorporate one or more parts of any process flow described herein.

As shown in FIG. 5, the system 530, and the user input system 540 are each operatively and selectively connected to the network 510, which may include one or more separate networks. In addition, the network 510 may include a telecommunication network, local area network (LAN), a wide area network (WAN), and/or a global area network (GAN), such as the Internet. It will also be understood that the network 510 may be secure and/or unsecure and may also include wireless and/or wired and/or optical interconnection technology.

The user input system 540 may include any computerized apparatus that can be configured to perform any one or more of the functions of the user input system 540 described and/or contemplated herein. For example, the user may use the user input system 540 to transmit and/or receive information or commands to and from the system 530. In some embodiments, for example, the user input system 540 may include a personal computer system (e.g. a non-mobile or non-portable computing system, or the like), a mobile computing device, a personal digital assistant, a mobile phone, a tablet computing device, a network device, and/or the like. As illustrated in FIG. 5, in accordance with some embodiments of the present invention, the user input system 540 includes a communication interface 542, a processor 544, a memory 546 having an user application 547 stored therein, and a user interface 549. In such embodiments, the communication interface 542 is operatively and selectively connected to the processor 544, which is operatively and selectively connected to the user interface 549 and the memory 546. In some embodiments, the user may use the user application 547 to execute processes described with respect to the process flows described herein. Specifically, the user application 547 executes the process flows described herein.

Each communication interface described herein, including the communication interface 542, generally includes hardware, and, in some instances, software, that enables the user input system 540, to transport, send, receive, and/or otherwise communicate information to and/or from the communication interface of one or more other systems on the network 510. For example, the communication interface 542 of the user input system 540 may include a wireless transceiver, modem, server, electrical connection, and/or other electronic device that operatively connects the user input system 540 to another system such as the system 530. The wireless transceiver may include a radio circuit to enable wireless transmission and reception of information. Additionally, the user input system 540 may include a positioning system. The positioning system (e.g. a global positioning system (GPS), a network address (IP address) positioning system, a positioning system based on the nearest cell tower location, or the like) may enable at least the user input system 540 or an external server or computing device in communication with the user input system 540 to determine the location (e.g. location coordinates) of the user input system 540.

Each processor described herein, including the processor 544, generally includes circuitry for implementing the audio, visual, and/or logic functions of the user input system 540. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 547 of the memory 546 of the user input system 540.

Each memory device described herein, including the memory 546 for storing the user application 547 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. The memory may store any one or more of pieces of information and data used by the system in which it resides to implement the functions of that system.

As shown in FIG. 5, the memory 546 includes the user application 547. In some embodiments, the user application 547 includes an interface for communicating with, navigating, controlling, configuring, and/or using the user input system 540. In some embodiments, the user application 547 includes computer-executable program code portions for instructing the processor 544 to perform one or more of the functions of the user application 547 described and/or contemplated herein. In some embodiments, the user application 547 may include and/or use one or more network and/or system communication protocols.

Also shown in FIG. 5 is the user interface 549. In some embodiments, the user interface 549 includes one or more output devices, such as a display and/or speaker, for presenting information to the user. In some embodiments, the user interface 549 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 549 includes the input and display devices of a mobile device, which are operable to receive and display information.

FIG. 5 also illustrates a system 530, in accordance with an embodiment of the present invention. The system 530 may refer to the "apparatus" described herein. The system 530 may include any computerized apparatus that can be configured to perform any one or more of the functions of the system 530 described and/or contemplated herein. In accordance with some embodiments, for example, the system 530 may include a computer network, an engine, a platform, a server, a database system, a front end system, a back end system, a personal computer system, and/or the like. Therefore, the system 530 may be a server managed by the entity. The system 530 may be located at the facility associated with the entity or remotely from the facility associated with the entity. In some embodiments, such as the one illustrated in FIG. 5, the system 530 includes a communication interface 532, a processor 534, and a memory 536, which includes a system application 537 and a structured database 538 stored therein. As shown, the communication interface 532 is operatively and selectively connected to the processor 534, which is operatively and selectively connected to the memory 536.

It will be understood that the system application 537 may be configured to implement any one or more portions of the various user interfaces and/or process flow described herein. The system application 537 may interact with the user application 547. It will also be understood that, in some embodiments, the memory includes other applications. It will also be understood that, in some embodiments, the system application 537 is configured to communicate with the structured database 538, the user input system 540, or the like.

It will be further understood that, in some embodiments, the system application 537 includes computer-executable program code portions for instructing the processor 534 to perform any one or more of the functions of the system application 537 described and/or contemplated herein. In some embodiments, the system application 537 may include and/or use one or more network and/or system communication protocols.

In addition to the system application 537, the memory 536 also includes the structured database 538. As used herein, the structured database 538 may be one or more distinct and/or remote databases. In some embodiments, the structured database 538 is not located within the system and is instead located remotely from the system. In some embodiments, the structured database 538 stores information or data described herein.

It will be understood that the structured database 538 may include any one or more storage devices, including, but not limited to, datastores, databases, and/or any of the other storage devices typically associated with a computer system. It will also be understood that the structured database 538 may store information in any known way, such as, for example, by using one or more computer codes and/or languages, alphanumeric character strings, data sets, figures, tables, charts, links, documents, and/or the like. Further, in some embodiments, the structured database 538 may include information associated with one or more applications, such as, for example, the system application 537. It will also be understood that, in some embodiments, the structured database 538 provides a substantially real-time representation of the information stored therein, so that, for example, when the processor 534 accesses the structured database 538, the information stored therein is current or substantially current.

It will be understood that the embodiment of the system environment illustrated in FIG. 5 is exemplary and that other embodiments may vary. As another example, in some embodiments, the system 530 includes more, less, or different components. As another example, in some embodiments, some or all of the portions of the system environment 500 may be combined into a single portion. Likewise, in some embodiments, some or all of the portions of the system 530 may be separated into two or more distinct portions.

In addition, the various portions of the system environment 500 may be maintained for and/or by the same or separate parties. It will also be understood that the system 530 may include and/or implement any embodiment of the present invention described and/or contemplated herein. For example, in some embodiments, the system 530 is configured to implement any one or more of the embodiments of the process flows described and/or contemplated herein in connection any process flow described herein. Additionally, the system 530 or the user input system 540 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for use in a network environment associated with a service provider, whereby a response associated with a service request is generated, the apparatus comprising:
    a memory device; and
    a processing device operatively coupled to the memory device, wherein the processing device is configured to execute computer-readable program code to:
        electronically receive, via a client computing device, a request associated with a service from a client;
        store the requested service in a cache area associated with the memory device, wherein the requested service is stored in the cache area temporarily;
        determine one or more user computing devices capable of processing one or more portions associated with the requested service, wherein the one or more portions of the requested service are processed by the one or more user computing devices concurrently, wherein the one or more computing devices are associated with one or more users;
        determine one or more network routes associated with each of the one or more computing devices for transmitting the one or more portions of the requested service to the one or more user computing devices via the one or more network routes;
        transmit the one or more portions of the requested service to the one or more computing devices via the one or more network routes for processing the requested service, wherein processing the one or more portions of the requested service on each of the one or more user computing devices further comprises:
- initiate the presentation of a first user interface, wherein the first user interface enables a user selection of one or more template types, wherein the selection of one or more template types are based on at least the service;
- receive, via the first user interface, a user selection of one or more template types;
- initiate the presentation of a second user interface based on at least the user selection of one or more template types, wherein the second user interface enables a user selection of one or more templates associated with the selected template type, wherein the selected one or more templates is based on at least the request associated the with the service;
- determine a client progress from the user based on at least the selection of the one or more templates, wherein the receiving a client progress further comprises:
  - determining a status associated with one or more stages of the service; and
  - determining one or more products and documents associated with the service, wherein the one or more products and documents are a requirement for a completed implementation of the service;
- receive, from each of the one or more user computing devices, the status associated with the progress level of the service being processed by each of the one or more computing devices;
- generate a response based on at least receiving the status from each of the one or more user computing devices; and
- transmit control signals configured to cause the client computing device to display the response to the client.

2. The apparatus of claim 1, wherein the request comprises a status request.

3. The apparatus of claim 1, wherein the second user interface enables a user selection of a template from a dropdown list of one or more templates to generate an overview of the selected template.

4. The apparatus of claim 1, wherein the one or more stages comprises one or more selectable options indicating a progress level associated with the one or more stages.

5. The apparatus of claim 4, wherein the one or more stages are at least one of getting started, documentation, implementation, training, and confirmation.

6. The apparatus of claim 4, wherein the response comprises a completion status associated with each of the one or more stages associated with the service.

7. The apparatus of claim 1, wherein the response comprises an estimated time of completion of the service.

8. The apparatus of claim 1, wherein the response comprises standard verbiage.

9. The apparatus of claim 1, wherein the one or more products and documents are presented in a tabular format.

10. The apparatus of claim 9, wherein the table associated with the one or more products comprises at least one of a product name, a product parent, a brief description of the product, and account information associated with the client and the documents comprises at least one of a document type and a document title.

11. The apparatus of claim 1, wherein the response comprises a client information, wherein the client information comprises at least one of a client contact information, client notes, and client dates associated with the service.

12. The apparatus of claim 1, wherein the response comprises a template option, wherein the template option enables a user to navigate between one or more templates.

13. The apparatus of claim 12, wherein a user selection of the template option initiates the presentation of the second user interface to enable a user selection of one or more templates.

14. The apparatus of claim 13, wherein the second user interface comprises an index option, wherein the index option initiates the presentation of the first user interface to enable a user selection of one or more template types.

15. The apparatus of claim 1, wherein the response comprises an option to send the response as an email to the client, wherein a user selection of the option to send the response as an email to the client comprises an initiation of an email client associated with the module.

16. The apparatus of claim 15, wherein the module is further configured to automatically capture a client name and a company name in the email to the client.

17. The apparatus of claim 1, wherein the response comprises one or more hyperlinks.

18. The apparatus of claim 1, wherein the one or more template types are associated with at least one of a one or more treasury products and one or more cash management essentials.

19. A method for use in a network environment associated with a service provider, whereby a response associated with a service request is generated, the method comprising:
- receiving, via a client computing device, a request associated with a service from a client;
- storing, using a computing device processor, the requested service in a cache area associated with the memory device, wherein the requested service is stored in the cache area temporarily;
- determining, using a computing device processor, one or more user computing devices capable of processing one or more portions associated with the requested service, wherein the one or more portions of the requested service are processed by the one or more user computing devices concurrently, wherein the one or more computing devices are associated with one or more users;
- determining, using a computing device processor, one or more network routes associated with each of the one or more computing devices for transmitting the one or more portions of the requested service to the one or more user computing devices via the one or more network routes;
- transmitting, using a computing device processor, the one or more portions of the requested service to the one or more computing devices via the one or more network routes for processing the requested service, wherein processing the one or more portions of the requested service on each of the one or more user computing devices further comprises:
  - initiating, using a computing device processor, the presentation of a first user interface, wherein the first user interface enables a user selection of one or more template types, wherein the selection of one or more template types are based on at least the service;
  - receiving, via the first user interface, a user selection of one or more template types;
  - initiating, using a computing device processor, the presentation of a second user interface based on at least a user selection of one or more template types, wherein the second user interface enables a user selection of one or more templates associated with the selected template type, wherein the selected one or more templates are based on at least the request associated the with the service;

determining, using a computing device processor, a client progress from the user based on at least the selection of the one or more templates, wherein the receiving a client progress further comprises:
  determining a status associated with one or more stages of the service; and
  determining one or more products and documents associated with the service, wherein the one or more products and documents are a requirement for a completed implementation of the service;

receiving, from each of the one or more user computing devices, the status associated with the progress level of the service being processed by each of the one or more computing devices;

generating, using a computing device processor, a response based on at least receiving the status from each of the one or more user computing devices; and transmitting, using a computing device processor, control signals configured to cause the client computing device to display the response to the client.

20. A computer program product for use in a network environment associated with a service provider, whereby a response associated with a service request is generated, the computer program product comprising a non-transitory computer-readable medium comprising code causing a first apparatus to:

electronically receive, via a client computing device, a request associated with a service from a client;

store the requested service in a cache area associated with the memory device, wherein the requested service is stored in the cache area temporarily;

determine one or more user computing devices capable of processing one or more portions associated with the requested service, wherein the one or more portions of the requested service are processed by the one or more user computing devices concurrently, wherein the one or more computing devices are associated with one or more users;

determine one or more network routes associated with each of the one or more computing devices for transmitting the one or more portions of the requested service to the one or more user computing devices via the one or more network routes;

transmit the one or more portions of the requested service to the one or more computing devices via the one or more network routes for processing the requested service, wherein processing the one or more portions of the requested service on each of the one or more user computing devices further comprises:
  initiate the presentation of a first user interface, wherein the first user interface enables a user selection of one or more template types, wherein the selection of one or more template types are based on at least the service;
  receive, via the first user interface, a user selection of one or more template types;
  initiate the presentation of a second user interface based on at least the user selection of one or more template types, wherein the second user interface enables a user selection of one or more templates associated with the selected template type, wherein the selected one or more templates is based on at least the request associated the with the service;

determine a client progress from the user based on at least the selection of the one or more templates, wherein the receiving a client progress further comprises:
  determining a status associated with one or more stages of the service; and
  determining one or more products and documents associated with the service, wherein the one or more products and documents are a requirement for a completed implementation of the service;

receive, from each of the one or more user computing devices, the status associated with the progress level of the service being processed by each of the one or more computing devices;

generate a response based on at least receiving the status from each of the one or more user computing devices; and transmit control signals configured to cause the client computing device to display the response to the client.

* * * * *